Dec. 20, 1927.
A. HERZ
1,653,177
FLOW INDICATOR
Filed Dec. 26, 1924    2 Sheets-Sheet 2
Fig. 7
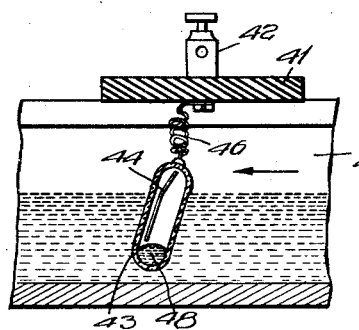
Fig. 8.
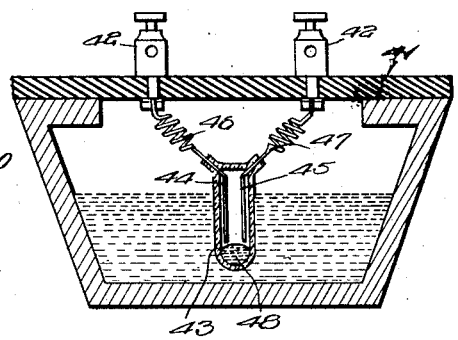
Fig. 9.
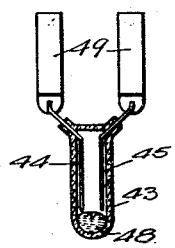
Fig. 10.
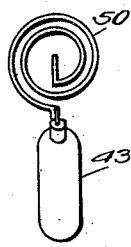
Fig. 11.
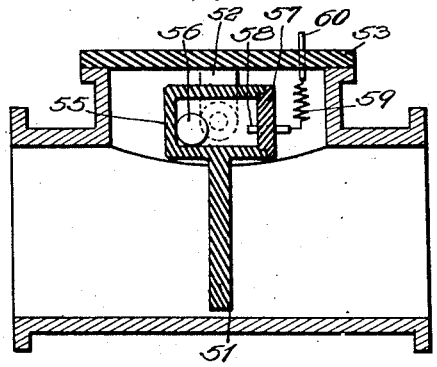
Fig. 12.
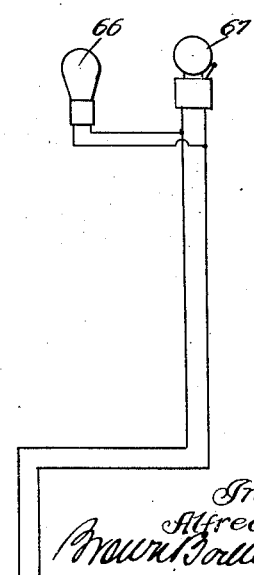
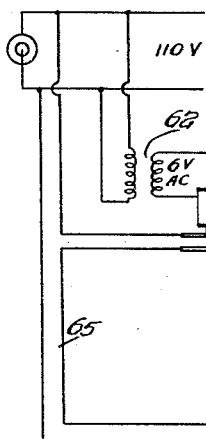
Witnesses:
W. F. Kilroy
Harry E. B. Haite
Inventor:
Alfred Herz
By Brown Bowen
Dunner   Attys Patented Dec. 20, 1927.

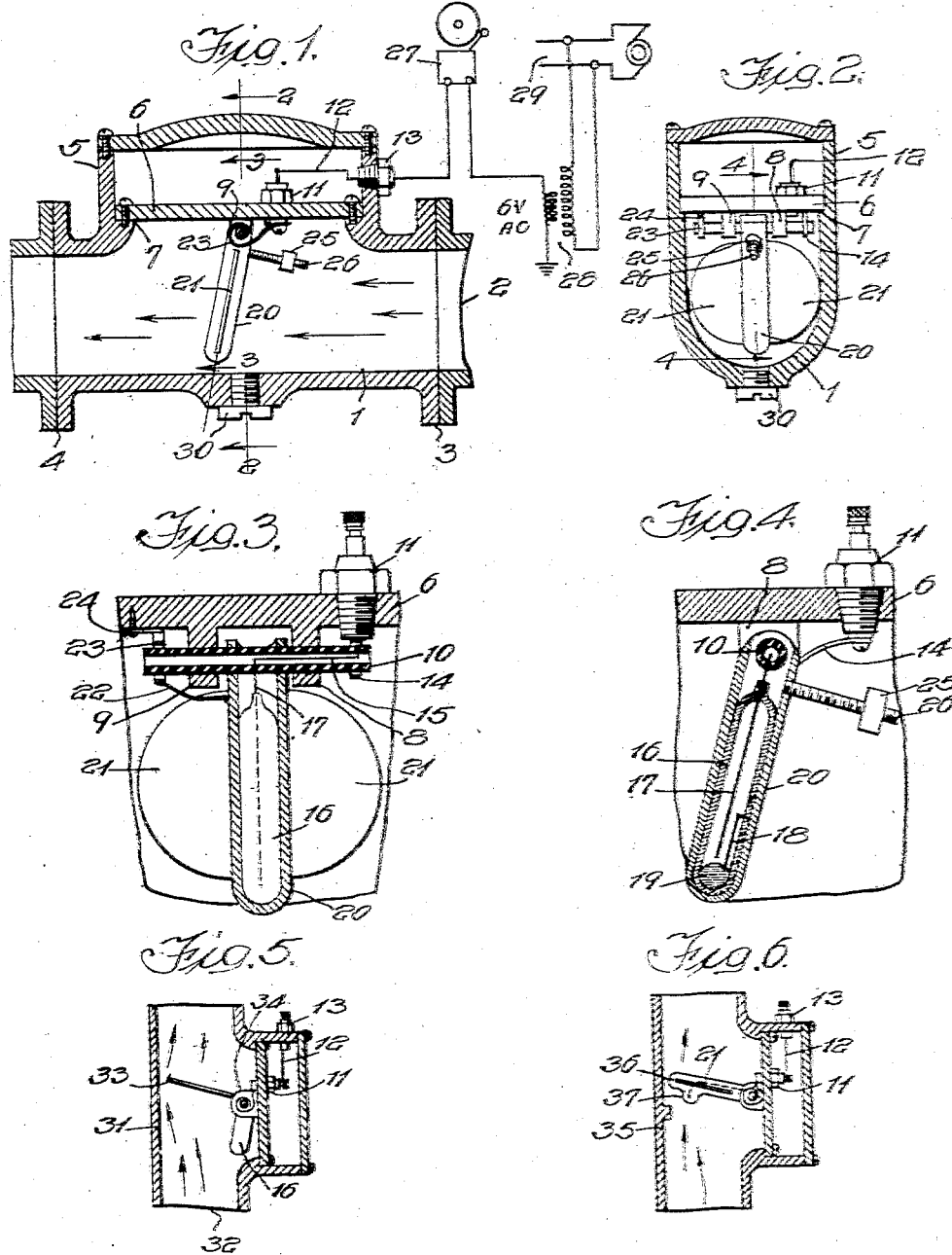

1,653,177

UNITED STATES PATENT OFFICE.

ALFRED HERZ, OF CHICAGO, ILLINOIS.

FLOW INDICATOR.

Application filed December 26, 1924. Serial No. 758,112.

My present invention relates to flow indicators and is particularly applicable to the type known as low water alarms.

In the operation of transformers of relatively large capacity and in constant use, water cooling is employed in order to prevent undue rise of temperature and damage to the insulation of the transformer.

The usual type of water cooling involves a heat exchange device for cooling the insulating oil of the transformer. Water is caused to flow through the heat exchange device and the rate of water flow is kept under observation through the medium of a flow indicator. In some cases the heat exchange device comprises a coil of pipe for the transformer oil submerged in a flowing stream. In such case the flow of oil through the pipes is kept under observation by the indicator.

When the transformer is in operation, it is essential that the flow of liquid be not reduced below a predetermined minimum or interrupted. An indicator or alarm device is desirable to call attention to any deficiency in flow. I am aware that numerous schemes have been proposed to accomplish the result, but the devices of this class as heretofore constructed have been unreliable and cumbersome. One difficulty with such devices is that due to long periods between operation, the lack of attention permits corrosion and deterioration to occur without observation by the attendant, and such corrosion or deterioration is not apparent until the alarm is called upon to operate and fails. One great difficulty with devices of this class is a tendency for the contact points to corrode and become inoperative due to moisture and exposure to atmospheric conditions. Another difficulty with devices of this general class is that all with which I am familiar, require some sort of packing gland or stuffing box which affords considerable friction initially, and which generally fouls and corrodes to the extent of making the device completely unworkable after long periods of undisturbed use.

It is the aim of the present invention to provide a simple and reliable instrument of this class. According to my invention, I employ contacts which are sealed in a permanently closed chamber. The tendency to corrode and become inoperative due to atmospheric conditions is thus obviated. At the same time, since these contacts are sealed off, I find that it is possible to dispose the contacts directly in the stream of liquid or fluid or within the conduit in which the flow is to be indicated, and this eliminates stuffing boxes, and the like, and provides an instrument which may be made very sensitive and highly accurate. Preferably I use a small glass bulb which has a pair of contacts sealed therein and a globule of mercury to close the connection between them when the bulb or capsule is moved to a certain predetermined position. The contact mechanism may be varied widely within the limits of my invention. Any form of sealed contact mechanism which employs a movable contact operated by gravity for changes in position of the bulb or chamber may be used instead. I employ relatively low voltage such, for example, as six volt alternating current, the voltage being so low that no appreciable loss occurs even though the conductors or leads to the contacts are directly in contact with the water, and due to the employment of alternating current, electrolysis is effectively suppressed.

This phase of the invention is novel and useful independently of the particular form or type of the contact mechanism.

In order to give an indication at a distance, I employ a relay controlled alarm circuit which alarm circuit is preferably operated at considerably higher voltage, for example 110 volts A. C. or D. C.

While I have heretofore referred to liquid flow, it is to be understood that gas or vapor flow may be indicated instead. Where liquid is under observation it need not be confined in a closed conduit or pipe as my device will indicate flow in an open channel.

Now in order to acquaint those skilled in the art with the manner of constructing and operating a device embodying my invention, I shall describe in connection with the accompanying drawings, a specific embodiment of the same.

In the drawings:

Figure 1 is a longitudinal section through an indicating device embodying my invention;

Fig. 2 is a transverse section taken on the line 2—2 of Fig. 1;

Fig. 3 is an enlarged section on the line 3—3 of Fig. 1;

Fig. 4 is a transverse section on an enlarged scale on the line 4—4 of Fig. 2;

Fig. 5 is a longitudinal cross section of a modification in which the flow is vertical;

Fig. 6 is a like view of another modification;

Fig. 7 is a longitudinal section through a modification showing an open channel in which my indicator is employed;

Fig. 8 is a transverse sectional view of the same;

Fig. 9 is a fragmentary sectional view of a modified form of contact mechanism;

Fig. 10 is a side elevational view of another modified form of contact mechanism;

Fig. 11 is a longitudinal section of a modified embodiment of my invention; and

Fig. 12 is a transverse sectional view of the same, including a circuit diagram.

In the drawings, in Fig. 1, I provide a conduit 1 through which a fluid is adapted to flow, in the present instance from the right to the left, as viewed in Fig. 1, this conduit being in the present instance formed in the shape of a T to form an indicator body, which may be connected in the pipe line 2, as by means of the clamping flanges 3 and 4, or any other convenient manner. Instead of clamping flanges, pipe threads may be employed, this being within the skill of the art. The body 1 has a vertical extension 5, the top of which is closed off by a suitable rain tight cover and within which is seated a diaphragm 6 upon an annular seat 7, this diaphragm 6 being secured upon said seat to provide a fluid tight joint. Upon the bottom of the diaphragm 6 I have formed a pair of integral lugs 8 and 9 through which passes a hollow rod or tube 10 made of insulating material such as bakelite, or the like. A fluid tight insulating plug 11 is threaded into an opening in said diaphragm 6 to provide an electrical connection insulated from the body of the conduit, the upper end of which plug is connected by a suitable conductor, as 12, to the lower end of a plug 13 which also serves as a means for passing an electrical conductor through the grounded wall of the extension 5. The lower end of the plug 11 is connected through a flexible conductor 14, which flexible conductor 14 is in the shape of a spiral spring, like a clock spring. This flexible conductor 14, which may be termed a pigtail, in turn connects with a conductor 15 disposed in the hollow rod 10 and leading down to a contact sealed in a glass switch bulb 16. The glass bulb 16 comprises a pair of contacts 17 and 18 as shown in Fig. 4, and a globule of mercury 19, which is disposed in the glass bulb 16 and is adapted, under change in position of the bulb 16, to make and break contact between said contact points 17 and 18. The glass bulb serves as an insulating support for said contacts and the contact 17 has a conductor 15 connected thereto, externally of the same, whereas the contact 18 is grounded upon the brass or bronze tube 20 within which said glass tube 16 is disposed. This bronze tube or housing 20 is suspended upon the hollow rod 10 and secured thereto mechanically. A pair of wings or vanes 21 are connected to the sides of the housing 20 so as to offer an extensive surface to the flow of fluid through the body 1. These wings or vanes may be flat or may be curved, if desired, to secure various effects or reactions. The relatively movable contacts 17 and 18 are so positioned with respect to the relatively movable contact 19, that is, the body of mercury, that a predetermined flow through the body 1 will tilt the movable system, including the wings 21 and the contact making bulb 16, into such position that the circuit is opened between the body of mercury 19 and the insulated contact member 17.

Upon diminution of flow beyond a certain point, the moving member assumes a position more or less vertical, bringing the mercury 19 into contact with the terminal 17 and closing the electric circuit. The metal tube or housing 20 is grounded through a conductor 22 leading from said housing to the spiral pigtail or connecting spring 25, the outer end of which is grounded at 24 to the diaphragm or plate 6. It is immaterial that the sides of the housing 20 may rub against the lugs 8 and 9, since the housing is intended to be grounded and the conductor 22 and pigtail 23 are merely means for insuring that a good ground is at all times maintained.

The position of the moving vane with its contained contact may be controlled by means of the counterbalance 25 which is threaded upon a threaded stem 26 mounted on the housing 20. Thus, by adjusting the position of the counterpoise 25, the contact making device may be adjusted to give the desired closing of contacts upon the attainment of a predetermined minimum flow of fluid.

The body 1 is preferably tilted at a slight angle to the left, as indicated in Fig. 1, so as to drain down any liquid which would tend to collect in the bottom of the conduit.

It is not necessary that the vanes 21 fit closely within the conduit 2, a loose fit being permissible and, in fact, the vanes or wings 21 may be much smaller than the bore of the housing 1. The function of these vanes is to provide sufficient surface so that movement of the liquid tends to swing the moving system to a position which will keep the circuit open in the open circuit form of the device, or which will keep the circuit closed if a closed circuit alarm is employed. In the diagram of Fig. 1 I have indicated the alarm signal, in this case an electric bell 27, connected in circuit with the bulb 16, this bulb being in effect a controlling switch. The signal 27 is connected to a source of six volt alternating current, in this case the secondary of a small transformer 28 which is fed from suitable alternating current mains 29. It will be obvious that if a closed circuit is to be maintained, the relation of the movable contact member 19 to the fixed contact member 17 is to be reversed, namely, that these parts are to be in contact until minimum flow occurs, when the circuit controlling switch assumes its most nearly vertical position.

The body 1 is provided with a drain plug 30 by which liquid may be drained out of the body 1 when it is desired to take the device out of commission.

In Fig. 5 I have indicated the manner in which a device, according to my invention, may be embodied in a vertical run of pipe. In this case the body 31 is disposed with the conduit 32 running vertically and in said conduit I provide a vane or disc 33 which is pivotally mounted upon a lug or lugs 34, and is connected to a circuit controlling device comprising a bulb 16 with its contacts disposed, as shown in Fig. 4, for closing the circuit when the flow of liquid is insufficient to maintain the vane or disc 33 in raised position.

In Fig. 6 I have indicated a modification in which a vertically disposed body 35 contains a movable circuit controller 36, this circuit controller being substantially identical with that shown in Figs. 1 to 4, with the exception that there is a small projection 37 on the bottom thereof, forming a recess or pool for the mercury. So long as the movable body 36 is raised, contact is not closed, but when the body moves down to substantially horizontal position, the mercury fills the pool to the point of closing the circuit with the alarm. Suitable wings 21, like those shown in Figs 1 to 4, are mounted on the side of the movable body 36.

In Figs. 7 and 8 I have indicated how my invention may be applied to indicating minimum flow for any desired rate of flow in an open channel 40. In this case a supporting plate 41 of insulation is supported across the top of the channel or trough 40 and upon the support 41 are mounted the terminals or binding posts 42. The contact making device 43, which consists of a glass bulb having the globule of mercury 43 sealed therein, and having two contact wires 44 and 45 supported and sealed in the glass walls and extending down to a point adjacent the globule of mercury 43. These contacts are adapted to be closed by the globule of mercury 43 when the flow in the channel 40 reaches a predetermined minimum or, if desired, the contacts may be so constructed that the connection between them is opened upon the attainment of a predetermined minimum, depending upon whether the circuit is an open circuit or a closed circuit system. The contact making device 43 is, in the present case, mounted for springing movement upon the wire springs 46 and 47, which serve both as conductors between the binding posts 42 and the contact wires 44 and 45 and also as pivotal mountings for the contact making device 43.

Instead of having helical connections 46 and 47, I may employ flat springs, such as 49 as shown in Fig. 9, serving the dual function of making electrical contact and providing mechanical mounting. In the form shown in Fig. 10, I provide spiral springs 50 which may thus electrically and mechanically connect the stationary terminals with the movable contact making device 43.

It will be seen from the foregoing, that the movement of the contact making device is not dependent upon suspension on a fixed or rigid pivot, but the same effects may be secured by the yielding mounting, all to the end of securing a different position of the contact making device for different degrees of flow. The gravity operated movable contact, namely the globule of mercury, assuming different positions for different positions of the contact making device to open or close the circuit as the case may be. While in each of the foregoing embodiments I have shown a globule of mercury as the gravity controlled movable contact member, it is to be understood that I do not limit myself to a liquid globule in the contact making device, but may employ, for example, a metal ball. In the embodiment shown in Figs. 11 and 12, I provide a swinging gate member 51 which is pivotally mounted on a pair of lugs 52 from a cover member 53. This gate member 51 has formed integral therewith a chamber 55 in which a metal ball 56 is contained. Chamber 55 is closed by a cover member 57, which contains a pair of contacts 58 adapted to be engaged by the metal ball 56 to close the circuit between such contacts 58. These contacts 58, which are molded in the cover member 57, are connected by flexible conductors, in the present case helical springs 59, to the stationary contacts 60 which are mounted in the cover member 53. While I have shown the cover member 53 as being disposed over an opening in the T member 61, it is to be understood that such cover member 53 might form a support for the movable gate member 51 and connected contacts for an open channel, if so desired. The gate member 51 may fit the interior of the T 61 more or less closely, as may be desired, so that it will partake in the position of the rate of flow of the fluid through the device.

While in each case above I have shown liquid as being the fluid, the flow of which is under consideration, it is to be understood that gas or vapor may be under consideration instead and an indication given of a critical value either for minimum flow or maximum flow.

Also, while I have shown in the foregoing an open circuit alarm system, I have in Fig. 12 shown a closed circuit alarm system. In this system the terminals 60 are connected to a source of six volt alternating current, as indicated at 62, and in closed circuit with the relay 63. The contacts 64 of this relay 63 are included in an alarm circuit 65 which contains suitable indicators, such as the lamp 66 and the gong 67, and which circuit 65 is preferably connected to a source of 110 volt current so that the alarm devices may be placed at a distance.

It will now be seen that I have provided a contact mechanism which is disposed directly in the fluid, the flow of which is to be indicated, and due to the enclosed character of these contacts deterioration is prevented. The disposal of the contact mechanism directly in the current of fluid also permits the same to be made very light and hence of any desired degree of sensitivity within practical limits. The device is furthermore inexpensive because of simplicity and ease of manufacture.

I do not intend to be limited to the details shown and described.

I claim:

1. A device of the class described, a conduit for fluid, a sealed bulb containing a movable gravity operated contactor and a fixed contact disposed in said conduit and subject to movement by the flow of fluid in the conduit to change the circuit connection of said contactor with respect to said contact.

2. In combination, a conduit for fluid, a sealed bulb comprising a globule of mercury and a cooperating sealed in contact, and a pivotal mounting for said bulb in said conduit to subject the bulb to angular movement by variations in flow of the fluid.

3. In combination, a conduit for liquid, a sealed bulb comprising a globule of mercury and a cooperating sealed in contact, said bulb being disposed in said conduit, and a vane in said conduit exposing an extended surface to the flow of fluid in the conduit for moving the bulb to change the circuit.

4. In combination, a metal T, a plate closing one branch of the T, a swinging fluid flow operated member mounted on said plate, said member including a sealed bulb containing a liquid conductor and a fixed contact, said movable member being adapted to be moved by variations of flow of fluid to change the circuit connections between said fixed contact and said liquid conductor.

5. In combination, a conduit having a lateral opening, a diaphragm sealing said opening, an insulated conductor extending through said diaphragm, a shaft pivoted on the inside of said diaphragm, a swinging flow operated member connected to said shaft, said flow operated member comprising a sealed bulb containing a globule of mercury and a fixed contact, the connection between which is adapted to be changed by changes in flow of the fluid.

6. In combination, a conduit, a movable flow controlled member lying substantially transverse to the flow of fluid in the conduit, said member being pivotally mounted in the conduit and being adapted to be swung about the pivot by flow of fluid in the conduit, said member comprising a sealed chamber containing a fixed contact and a gravity operated contact, said gravity operated contact being movable under movement of said member.

7. In combination, a conduit, a movable flow controlled member lying substantially transverse to the flow of fluid in the conduit, said member being pivotally mounted in the conduit, and being adapted to be swung about the pivot by flow of fluid in the conduit, said member comprising a sealed chamber containing a fixed contact and a gravity operated contact, said gravity operated contact being movable under movement of said member and a counterbalancing means for graduating the position of said member.

8. In combination, a T shaped conduit member having a diaphragm mounted in one leg of the T, a swinging gate member pivoted on the bottom of said diaphragm, said gate member being subjected to movement of flow of liquid through the other arms of the T, said pivot comprising a horizontal sleeve of insulating material, said gate comprising a glass bulb having a pair of contacts sealed therein, and a globule of mercury for connecting the contacts.

9. In combination, a T shaped housing member, one arm of the T being disposed substantially vertically, a diaphragm closing off said arm of the T, a gate member pivoted on the bottom of said diaphragm, and adapted to be actuated by the flow of a liquid in said T shaped housing, and a contact mechanism controlled by said gate, said contact mechanism comprising a pair of conductors adapted to be connected when said gate member is in a given position.

10. In combination, a channel for fluid, a stationary support, a contact mechanism having a part extending into said channel, said mechanism being mounted on said support for pivotal movement, and comprising a sealed chamber containing a movable gravity operated contact and a cooperating stationary contact.

11. In combination, a T shaped conduit having a diaphragm mounted in one leg of the T, a pair of lugs integral with the bottom side of the diaphragm, a tube of insulating material extending through said lugs, a glass switch bulb having a contact sealed therein fitted to said tube, a fluid tight insulating plug extending through an opening in said diaphragm, flexible conductor means leading from said plug to said insulating tube, and a conductor leading from said flexible conductor means through said tube to the contact sealed in the switch bulb.

12. In combination, a conduit for fluid, a movable flow controlled member mounted in said conduit and including a pair of cooperable contacts, one of said contacts being a liquid, and a mounting for said member connected to said conduit and permitting said member to move in accordance with the variations in the flow of the fluid in the conduit to change the connection between said contacts.

13. In combination a conduit for fluid, a movable flow controlled member mounted in said conduit and including a pair of cooperable contacts, one of said contacts being a liquid, and means connected to said member for varying its sensitivity to the flow.

14. In combination, a conduit for fluid, a movable flow controlled member mounted in said conduit and including a pair of cooperable contacts, one of said contacts being a liquid, and a wing element connected to said member responsive to the flow in the conduit to move said member in accordance therewith and to thus change the connection between said contacts.

15. In combination, a conduit for fluid, a movable flow controlled member mounted in said conduit and including a pair of cooperable contacts, one of said contacts being a liquid, and a mounting for said member including a pivot member connected to said conduit and comprising a tube of insulating material, said tube serving as a means for leading a conductor to one of said contacts.

In witness whereof, I hereunto subscribe my name this 23rd day of December, 1924.

ALFRED HERZ.